(12) United States Patent
Zheng et al.

(10) Patent No.: US 8,240,913 B2
(45) Date of Patent: Aug. 14, 2012

(54) FIBER OPTIC SENSING DEVICE AND METHOD

(75) Inventors: Danian Zheng, Simpsonville, SC (US); Norman Arnold Turnquist, Sloansville, NY (US); Peter John Eisenzopf, Altamont, NY (US); Kevin Thomas McCarthy, Troy, NY (US); Hua Xia, Altamont, NY (US); Roy Paul Swintek, Altamont, NY (US)

(73) Assignee: General Electric Company, Niskayuna, NY (US)

( * ) Notice: Subject to any disclaimer, the term of this patent is extended or adjusted under 35 U.S.C. 154(b) by 994 days.

(21) Appl. No.: 12/236,553

(22) Filed: Sep. 24, 2008

(65) Prior Publication Data
US 2010/0074572 A1  Mar. 25, 2010

(51) Int. Cl.
*G01M 15/00* (2006.01)
*G01J 5/00* (2006.01)
(52) U.S. Cl. ..................... 374/131; 73/112.02
(58) Field of Classification Search .......... 374/130, 374/131, 144, 147, 148, 161; 73/112.02
See application file for complete search history.

(56) References Cited

U.S. PATENT DOCUMENTS

| | | | |
|---|---|---|---|
| 6,923,048 B2 | 8/2005 | Willsch et al. | |
| 7,151,872 B1 * | 12/2006 | Xia et al. | 385/37 |
| 7,336,862 B1 | 2/2008 | Xai et al. | |
| 7,912,334 B2 * | 3/2011 | Xia et al. | 385/120 |
| 8,100,586 B2 * | 1/2012 | Ruggiero et al. | 384/103 |
| 2004/0223679 A1 * | 11/2004 | Pickrell et al. | 385/12 |
| 2005/0061058 A1 | 3/2005 | Willsch et al. | |
| 2006/0146909 A1 | 7/2006 | Morse et al. | |
| 2009/0087303 A1 * | 4/2009 | Ruggiero et al. | 415/118 |
| 2009/0324148 A1 * | 12/2009 | Ruggiero et al. | 384/103 |

OTHER PUBLICATIONS

Kwang Y. Lee, Stuart S. Yin, and Andre Boehman; "Intelligent Monitoring System With High Temperature Distributed Fiberoptic Sensor for Power Plant Combustion Processes"; Final Technical Report; Submitted to U. S. Department of Energy; Sep. 26, 2006; Downloaded from Internet:<http://www.osti.gov/bridge/servlets/purl/907882-CJ8X3I/907882.PDF>; 80 Pages.

Protopopov, V.N. ; Karpov, V.I.; Medvedkov, O.I.; Vasiliev, S.A.; Grekov, M.V.; Dianov, E.M.; Palto, S.P.; "Temperature sensor based on fiber Bragg grating"; Proceedings of SPIE—The International Society for Optical Engineering, v 4083, 2000, p. 224-228; ISSN: 0277-786X CODEN: PSISDG; (5 Pages).

(Continued)

*Primary Examiner* — Christopher Fulton
(74) *Attorney, Agent, or Firm* — Richard A. DeCristofaro

(57) ABSTRACT

A device includes a stationary, rotary component, and a fiber optic sensing system. The fiber optic sensing system includes a cable having one or more fiber optic sensors disposed on the stationary component, the rotary component, or combinations thereof. The fiber optic sensing system is configured to detect one or more first parameters including temperature, strain, pressure, vibration, torque; or combinations thereof related to the stationary component, the rotary component, or combinations thereof. The one or more first parameters is used to determine one or more second parameters including thermal expansion, clearance, fluid flow rate variation, condensation, fluid leakage, thermal loss, life, thermal stress, or combinations thereof related to the stationary component, the rotary component, or combinations thereof.

26 Claims, 5 Drawing Sheets

OTHER PUBLICATIONS

Xiaochun Li; Embedded Sensors in Layered Manufacturing"; A Dissertation Submitted to the Department of Mechanical Engineering and the Committee on Graduate Studies of Stanford University in Partial Fulfillment of the Requirements for the Degree of Doctor of Philosophy; Jun. 2001; Downloaded from Internet: <http://www-rpl.stanford.edu/user/files/papers/thesis_xcli.pdf>;(pp. 152)".

Xiaochun Li and Fritz Prinz; "Analytical and Experimental Study on Noncontact Sensing With Embedded Fiber-Optic Sensors in Rotating Metal Parts"; Journal of Lightwave Technology, vol. 22, No. 7, Jul. 2004 Downloaded from the Internet: <http://ieeexplore.ieee.org/iel5/50/29091/01310420.pdf?tp=&isnumber=&arnumber=1310420>;(8Pages).

\* cited by examiner

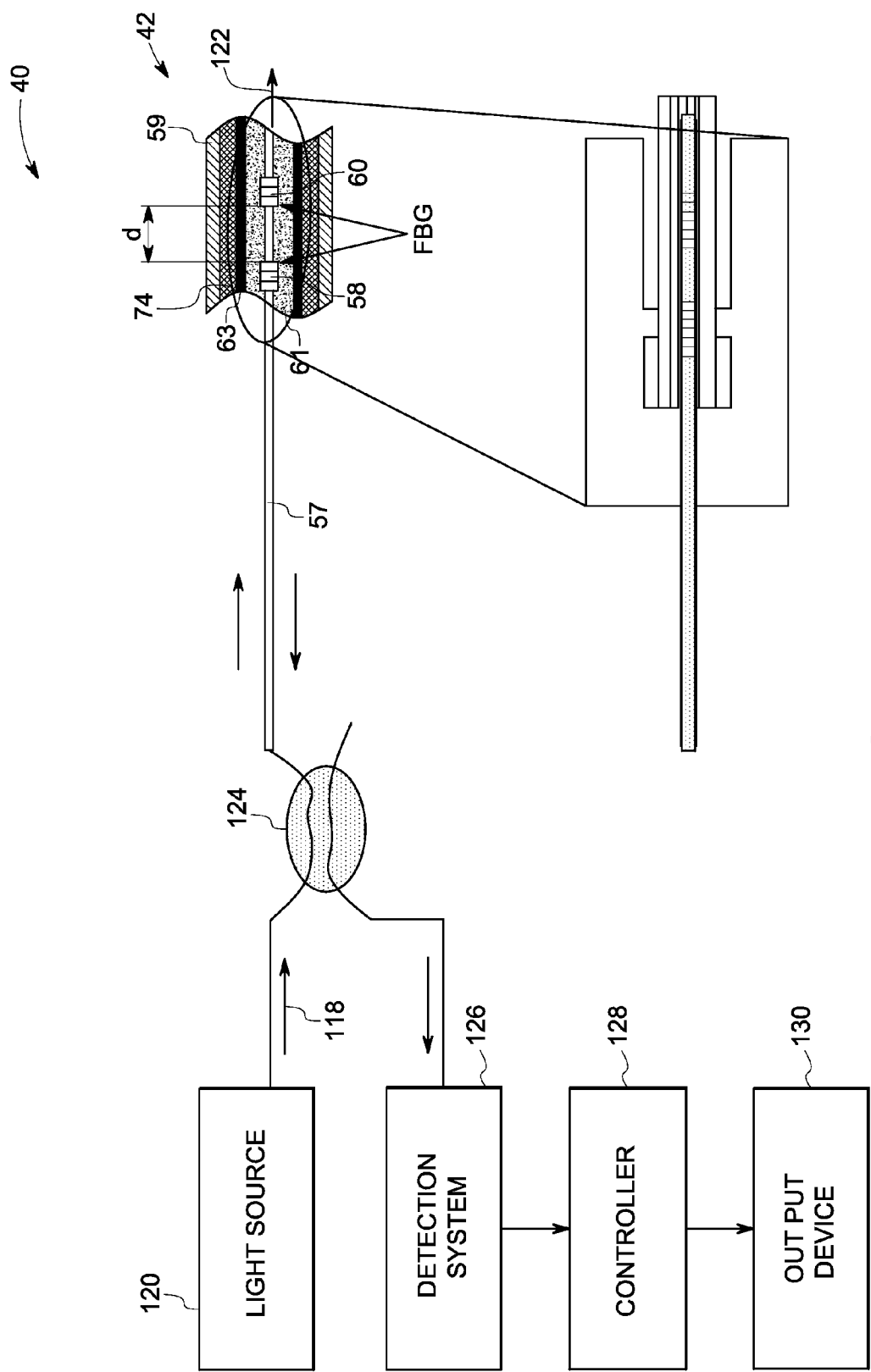

FIBER OPTIC SENSING DEVICE AND METHOD

BACKGROUND

The invention relates generally to fiber optic sensing devices, and more particularly, to a fiber optic sensing system and method for detecting multiple parameters from a power generation system or a component, for example, a turbomachine such as a steam turbine, or the like.

Turbomachines such as a steam turbine plant may include several steam or condensate pipes leading to and from a steam turbine and accessories of the plant. The steam or condensate pipes may also be provided with several valves. Steam condensation may occur at various points in the pipes, valves, and steam turbine. This condensation can slow starting or loading of the steam turbine. If the condensation is not detected, it can damage the steam turbine during start-up, loading or operating conditions of the turbine. Monitoring temperature at the various points of the steam turbine plant more continuously (rather than discretely) can help to identify the water or moisture traps and improve steam turbine and plant operability. It is difficult, however, to monitor temperature at all points where condensation can occur or water can collect due to the configuration of the various steam or condensate pipes, valves, and steam entry and exit points in the plant.

Additionally, the steam turbine casing has a temperature gradient and expands differently at different portions due to transient operation and its complex geometry. Understanding the distributed temperature of the casing during operation would greatly help to understand the expansion and clearances within the turbine. Knowledge regarding the operation information such as temperature, thermal expansion, moisture content related to the steam turbine system improves steam turbine and plant operability.

Conventionally, the internal temperatures of a steam turbine are measured by a small number of individual thermocouples or resistance temperature detectors positioned within the turbine casing, valve and piping locations. One limitation of the thermocouples is that thermocouples are single point measurements and can be easily misplaced in a region close to an intended target area resulting in a vastly different temperature reading due to the complex geometry of the turbine casing and internal heating conditions. It is difficult and expensive to provide large number of thermocouples in a distributed manner around the turbine.

It is desirable to have an economical device and method that can be used to extract one or more parameters such as temperature, thermal expansion, moisture content, or the like of a device such as a steam turbine for improving device operability, and also for providing optimized control of device for power generation.

BRIEF DESCRIPTION

In accordance with one exemplary embodiment of the present invention, a device includes a stationary component, a rotary component, and a fiber optic sensing system. The fiber optic sensing system includes a cable having one or more fiber optic sensors disposed on the stationary component, the rotary component, or combinations thereof. The fiber optic sensing system is configured to detect one or more first parameters including temperature, strain, pressure, vibration, torque; or combinations thereof related to the stationary component, the rotary component, or combinations thereof. The one or more first parameters are used to determine one or more second parameters including thermal expansion, clearance, fluid flow rate variation, condensation, fluid leakage, thermal loss, life, thermal stress, or combinations thereof related to the stationary component, the rotary component, or combinations thereof.

In accordance with another exemplary embodiment of the present invention, a steam turbine having a fiber optic sensing system is disclosed.

DRAWINGS

These and other features, aspects, and advantages of the present invention will become better understood when the following detailed description is read with reference to the accompanying drawings in which like characters represent like parts throughout the drawings, wherein:

FIG. 7 is a diagrammatical representation of a fiber optic sensing system in accordance with an exemplary embodiment of the present invention.

DETAILED DESCRIPTION

Figure 1:
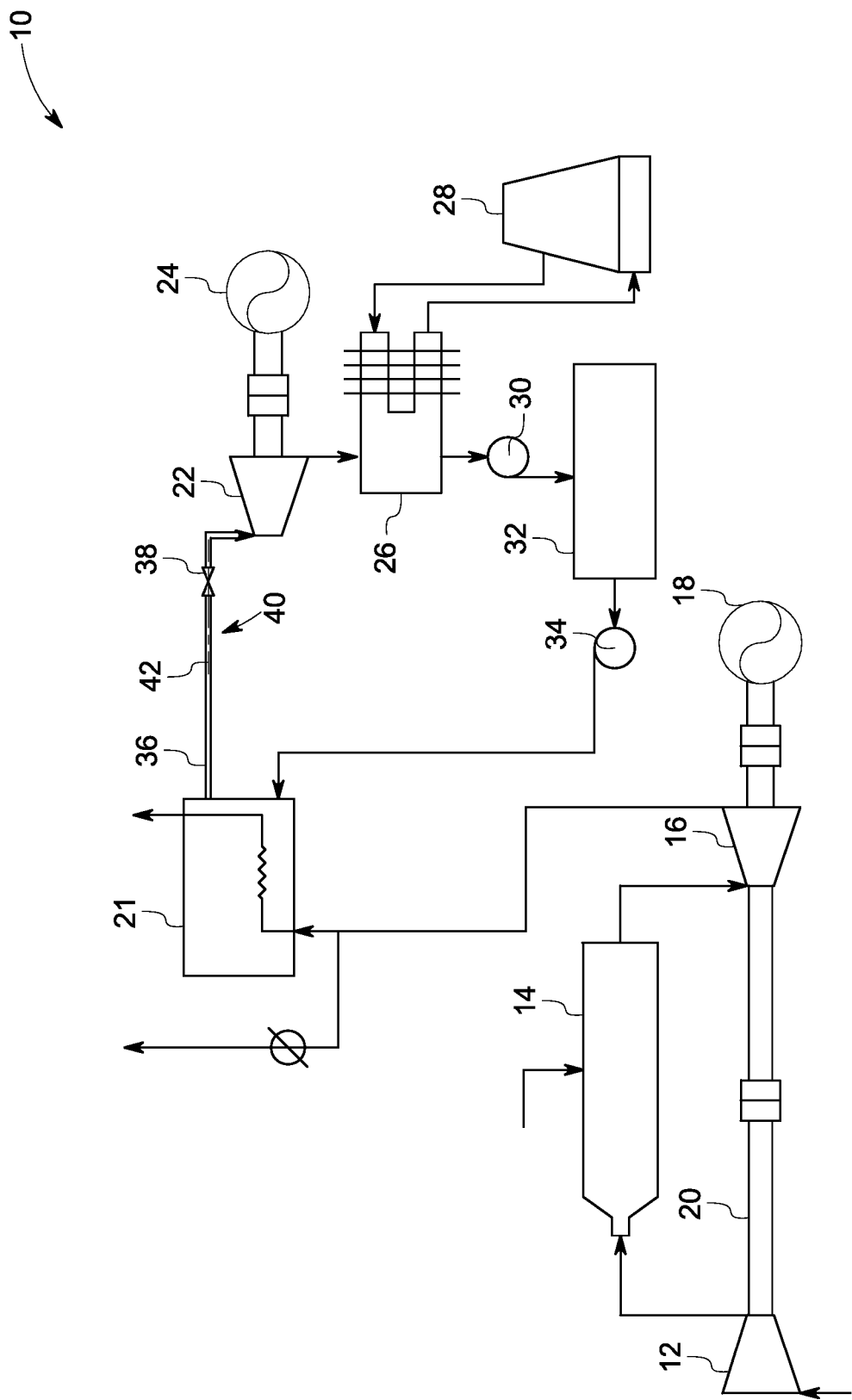
FIG. 1 is a diagrammatical representation of a combined-cycle power generating unit having a fiber optic sensing system disposed on one or more stationary component, rotary component, or combinations thereof in accordance with an exemplary embodiment of the present invention.

As discussed in detail below, embodiments of the present invention comprise a device including a stationary component and a rotary component. A fiber optic sensing system includes at least one cable having one or more fiber optic sensors disposed on the stationary component, the rotary component, or a combination thereof. The fiber optic sensing system is configured to detect one or more first parameters including temperature, strain, pressure, vibration, torque, or combinations thereof related to the stationary component, rotary component, or combinations thereof. In one embodiment, the device includes a rotary machine such as a steam turbine. The sensing cables are disposed in a distributed manner along an inner and/or outer surface of the stationary component, or rotary component.

The detected first parameters are used to determine thermal expansion, condensation, or the like related to the components. Embodiments of the present invention provide a real time and accurate feedback of the first parameters of a device operating in an environment, for example turbomachinery environment. As a result, it is possible to determine the working condition or performance of the rotary machine. Proactive measures can be undertaken to avoid machine downtime or process inefficiency based on the sensed data. Also, the fiber sensing system operates effectively in harsh environments, such as high temperature conditions, harsh oil conditions, or the like.

There are several fiber optic techniques used for measurement of temperatures, strain, vibration, or the like. Some of the techniques include a Fabry-Perot interferometer-based cavity probe, pyrometry, and fluorescence-based measurement. Fiber Bragg grating (FBG) based fiber optic sensors have a potential application for monitoring harsh environmental machine operation condition. Fiber bragg grating is a high quality reflector constructed in an optical fiber that reflects particular wavelengths of light and transmits other wavelengths. This is generally achieved by adding a periodic variation to a refractive index of the fiber. It is advantageous to use fiber Bragg gratings for power generation industrial process monitoring because of low mass, high sensitivity, easier multiplexing, multi-point distribution, and electromagnetic interference immunity.

Fiber Bragg grating sensors measure a parameter in an environment by its shift in wavelength. Such fiber sensors utilize a wavelength division multiplexing method to measure a parameter based upon a Bragg wavelength shift that is generated on illumination of the grating through an illumination source. Thus, environmental effects on the periodicity of the grating alter the wavelength of light reflected, thereby providing an indication of the environmental temperature or strain that could be associated with water condensation, moisture traps, for example. Further, multiple sensors at different wavelengths can be used to measure multiple parameters from multi-points.

The wavelength shift of each fiber optic sensor is determined by $\lambda=2n\Lambda$, where n is effective refractive index of the fiber core, and $\Lambda$ is the periodicity of the grating. A thermal response of the fiber sensor is determined based on the relation;

$$\Delta\lambda = \lambda\left(\frac{\partial n}{n\partial T} + \frac{\partial \Lambda}{\Lambda\partial T}\right)\Delta T,$$

where $\beta=\partial n/n\partial T \approx 8.6\times10^6$ and $\alpha=\partial\Lambda/\Lambda\partial T\approx 5.6\times10^7$ are thermo optic coefficient and coefficient of thermal expansion of fiber material, respectively, T is the temperature. On the other hand, a dynamic or static strain (mechanical response), induced by external environment such as steam pipeline, valve, or casing, can be determined based on the relation;

$$\Delta\lambda/\lambda=\kappa\epsilon(T)+\xi\epsilon(t),$$

where $\epsilon$ is static strain sensitivity, and $\xi$ is the dynamic strain sensitivity, t—is the time. Whenever the thermal properties of a host structure, such as steam turbine casing, pipeline, valve etc, needed to be monitored, temperature sensing could be obtained based on the relation;

$$\Delta\lambda=\lambda(\alpha+\beta)\Delta T$$

However, whenever the mechanical properties of a host structure, such as steam turbine loading, flow rate, rotor and blade deformation etc, needed to be monitored, stress and strain sensing could be obtained based on the relation;

$$\Delta\lambda/\lambda=\kappa\epsilon(T)+\xi\epsilon(t)$$

Referring to FIG. 1, an exemplary combined-cycle generating unit 10 configured to generate electric power is illustrated. The unit 10 includes a compressor 12 configured to receive ambient air at atmospheric pressure and to compress the air to a higher pressure. The compressed air is mixed with a gaseous or liquid fuel and combusted in a combustor 14. Combustion exhaust gas from the combustor is expanded via a gas turbine 16. A generator 18 coupled to the turbine 16 transforms the mechanical energy into electrical power. The gas turbine 16 drives the compressor 12 via a shaft 20. The exhaust gas from the gas turbine 16 is passed in heat exchange relationship with feed-water through a heat recovery boiler 21. As a result feed-water is heated to generate steam. The exhaust gas is vented from the heat recovery boiler 21 to the atmosphere via a stack. The steam from the boiler 21 is expanded via a steam turbine 22. A generator 24 coupled to the turbine 22 transforms the mechanical energy into electrical power. The steam exiting the steam turbine 22 passes through a condenser 26 where steam is transformed into water. The condenser 26 is cooled using water from a cooling tower 28 dissipating the steam's latent heat into the atmosphere. The condenser 26 may also be cooled using ambient air. The water from the condenser is then passed through a feed pump 30, a deaerator 32, and another feed pump 34 to the boiler 21.

In the illustrated embodiment, the steam from the boiler 21 is fed to the steam turbine 22 via a pipe 36. The pipe 36 may be provided with a valve 38 configured to control the flow of steam through the pipe 36. A fiber optic sensing system 40 including a plurality of fiber optic sensors (cables) 42 is disposed along the pipe 36, valve 38, and the steam turbine 22. The fiber optic sensing system is illustrated more clearly and explained in greater detail with reference to subsequent figures. The fiber optic sensing system 40 is configured to detect one or more first parameters comprising temperature, strain, pressure, vibration, torque; or combinations thereof related to the pipe 36, the valve 38, the steam turbine 22, or combinations thereof. The detailed configuration of the system 40 on the various components of the unit 10 and the working of the system 40 are explained in greater detail with reference to subsequent figures.

Figure 2:
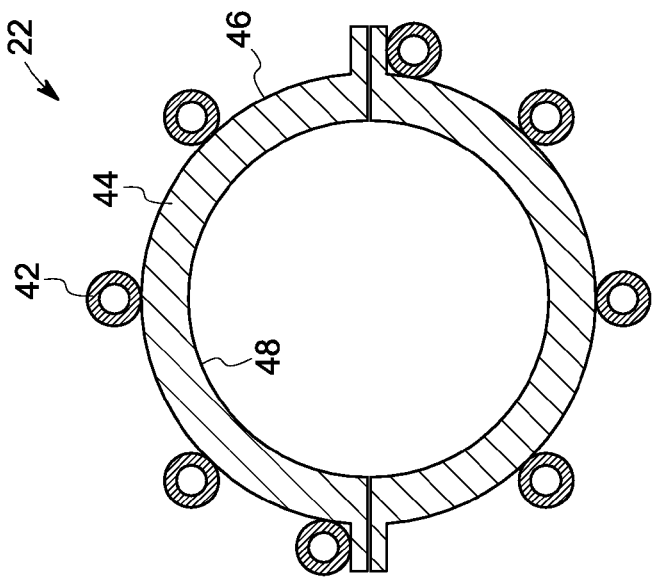
FIG. 2 is a diagrammatical representation of a steam turbine casing with sensor cables disposed thereon in accordance with an exemplary embodiment of the present invention.
Figure 2:
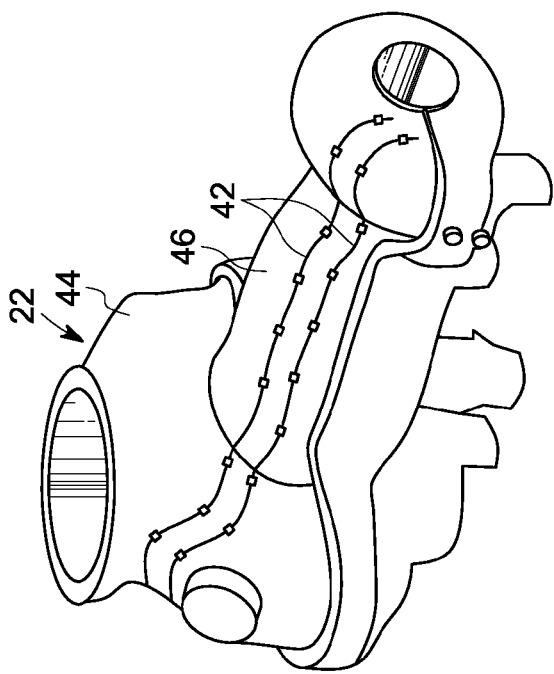

Referring to FIG. 2, a diagrammatical representation and a corresponding sectional view of a plurality of fiber sensing cables 42 disposed along a casing 44 of the steam turbine 22 are illustrated. In the illustrated embodiment, 8 cables 42 are illustrated. The cables 42 are spaced apart and disposed along a longitudinal direction of the casing 44. It should be noted herein that the number of fiber sensing cables, degree of spacing, and orientation of the cables 42 might vary depending upon the application. The cables 42 may be disposed along an outer surface 46, an inner surface 48, or combinations thereof of the casing 44.

It is known conventionally that the steam turbine casing 44 has different temperature and expands differently at different portions due to its transient operation and complex geometry and distribution of steam within the casing 44. Understanding the distributed temperature of the casing 44 during operation would greatly help to understand the expansion and clearance shift inside the turbine 22. When thermocouples or resistance temperature detectors are used, one limitation of the thermocouples is that thermocouples are single point measurements and can be easily misplaced in a region close to an intended target area resulting in a vastly different temperature reading due to the complex geometry of the turbine casing 44 and internal heating conditions. It is also difficult and expensive to provide a large number of thermocouples in a distributed manner around and/or within the casing 44. In accordance with the exemplary embodiment of the present invention, since the cables 42 are disposed in a distributed manner along the casing 44, distributed temperatures along the casing 44 are measured to establish the casing thermal expansion and clearance conditions. The sensor arrays disposed outside and inside the casing 44 measure temperature distribution over the whole casing 44 for calculating differential expansion of the casing 44. The fiber sensing cable 42 is thin and flexible enough to be fixed onto the surfaces of the steam turbine casing 44. In certain embodiments, the fiber sensing cables 42 are provided along a curved path and clamped on the casing 44 so as to compensate for any fiber sensing cable length change induced by the temperature variation of the casing 44. In one embodiment, the fiber optic sensing system 40 is configured to detect one or more first parameters comprising temperature, strain, pressure, vibration, torque; or combinations thereof related to the casing 44 of the turbine 22.

Figure 3:
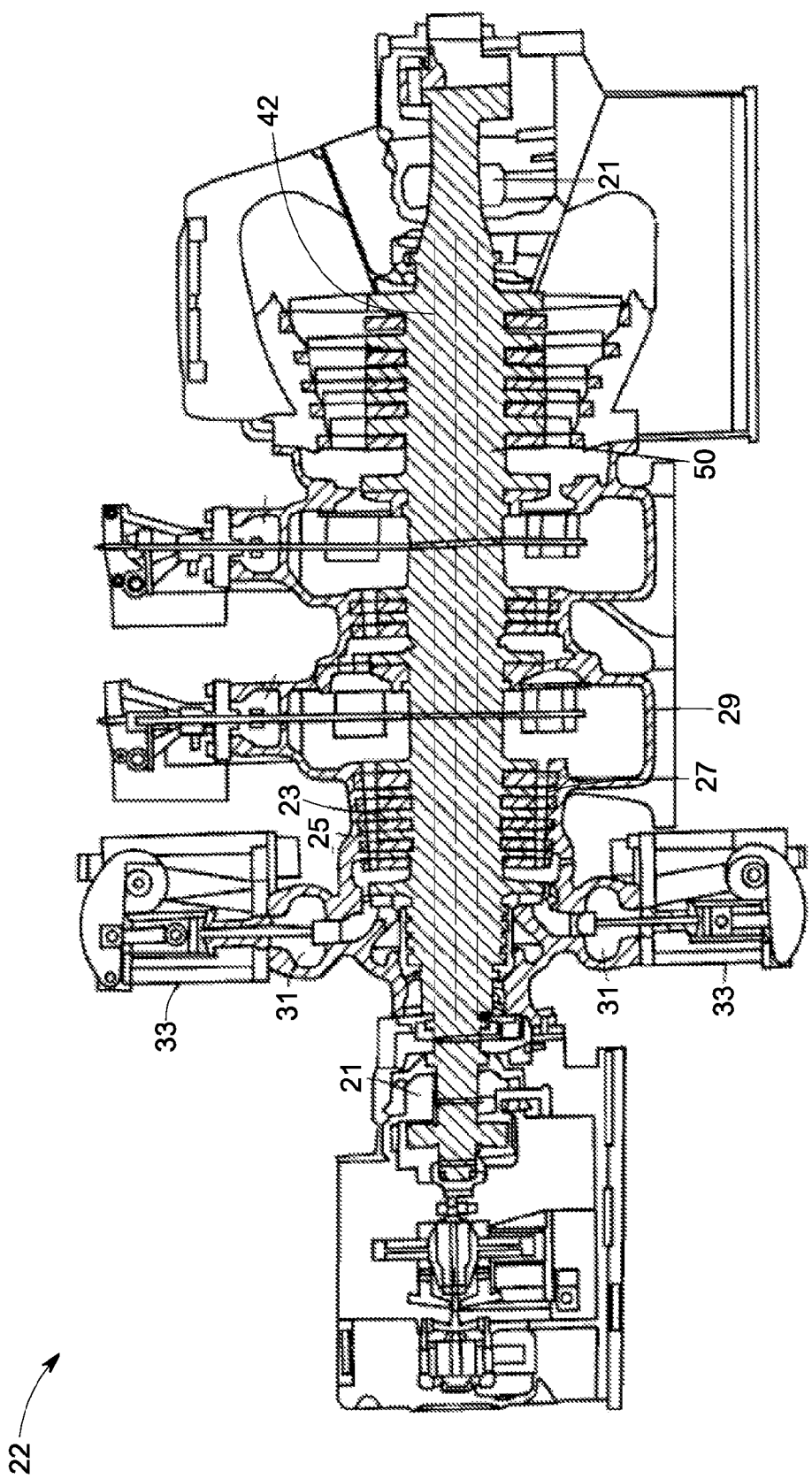
FIG. 3 is a diagrammatical representation of a turbine having a stator, a rotor with sensor cables disposed thereon in accordance with an exemplary embodiment of the present invention.

Referring to FIG. 3, a steam turbine 22 in accordance with an exemplary aspect of the present invention is illustrated. In examples, without limitation, the rotary machine 10 can be a centrifugal compressor, or a gas turbine, or a bearing, or a sump, or a generator, or the like. It may also be noted that the aspects of the present invention are not limited to an association with the rotary machine and may be associated with other machines subjected to harsh environmental conditions during operation such as heat recovery boilers, heat exchangers, or the like.

The turbine 22 includes a rotor shaft 50 extending through the turbine 22 and rotatably supported at each end by bearing supports 21. A plurality of rows of turbine blades 23 are coupled to the shaft 50. A plurality of stationary turbine nozzles 25 are positioned between adjacent rows of turbine blades 23. Turbine blades 23 are coupled to the turbine shaft 50, and turbine nozzles 25 are coupled to support members or nozzle diaphragms 27 coupled to a housing or shroud 29 surrounding turbine blades 23 and nozzles 25. Steam inlet ports 31 channel steam supplied from a steam source into the turbine 22. A main steam control valve 33 controls the flow of steam into the turbine 22. In operation, steam is directed through nozzles 25 to blades 23, which causes blades 23 to rotate with the rotor shaft 50. There is a relatively small clearance between the blades 23 and the shroud 29 to prevent excessive leakage of the working fluid, between the blades 23 and the shroud 29.

In the illustrated embodiment, a plurality of fiber sensing cables 42 are disposed along the rotor shaft 50 of the steam turbine 22. The cables 42 are spaced apart and disposed along a longitudinal direction of the rotor 50. It should be noted herein that the number of cables, degree of spacing, and orientation of the cables 42 along the rotor shaft 50 might vary depending upon the application. In accordance with the exemplary embodiment of the present invention, since the cables 42 are disposed in a distributed manner along the rotor shaft 50, distributed temperatures along the rotor shaft 50 may be measured to establish the thermal expansion and clearance conditions between rotor shaft 50 and the casing. In one embodiment, the fiber optic sensing system is configured to detect one or more first parameters comprising temperature, strain, pressure, vibration, torque; or combinations thereof related to the rotor shaft 50 of the turbine 22. In one embodiment, the system 40 may require means for converting optical data related to the rotor shaft 50 to a voltage and then using telemetry for transmitting the voltage signal. In one embodiment, the fiber sensing cables 42 are configured inside the rotor shaft 50 or casing such as in a bore, cavity, or channel. In certain other embodiments, the fiber sensing cables 42 may be disposed along both the rotor shaft 50 and the casing 44 of the turbine.

Figure 4:
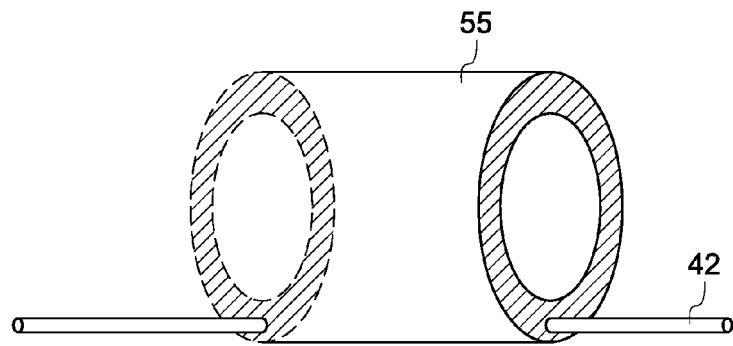
FIG. 4 is a diagrammatical representation of a fixture used to couple a sensor cable to a stationary component or a rotary component in accordance with an exemplary embodiment of the present invention.

Referring to FIG. 4 and FIG. 1, a fixture 55 used to couple the fiber sensing cable 42 to the pipe 36 (illustrated in FIG. 1) is illustrated. In the illustrated embodiment, the fiber sensing cable 42 is shown passing through the fixture 55. In other embodiments, the fixture 55 may have other cross-sections depending on the application. In one embodiment, the fiber sensing cable 42 may be clamped to a bottom of the pipe 36 via the fixture 55. In another embodiment, the fiber sensing cable 42 may be welded to an internal wall of the pipe 36. In certain other embodiments, the fiber sensing cable may be clamped to the valve 38 via the fixture 55 or welded to the valve. In some embodiments, the cable 42 may be clamped to the casing, rotor, valve, pipe, or combinations thereof for applications involving operation temperatures lower than 1000 degrees Fahrenheit. In certain embodiments, the cable 42 may be welded to the casing, rotor, valve, pipe, or combinations thereof for applications involving operation temperatures greater than 1000 degrees Fahrenheit. In certain other embodiments, the cable 42 may be glued to the casing, rotor, valve, pipe, or combinations thereof for applications involving operation temperatures greater than 600 degrees Fahrenheit.

It is known that water condensation may occur at certain locations of the pipe 36, the valve 38, and the steam turbine 22. Temperature of such locations is relatively cooler than other locations or surrounding areas of the pipe 36, the valve 38, and steam turbine 22. This condensation can slow starting or loading of the steam turbine. If the condensation is not detected, it can damage the steam turbine during start-up or loading or operation conditions of the turbine. In one embodiment, the sensor arrays disposed along the pipe 36, the valve 38, and the steam turbine 22 would measure temperature distribution over the pipe 36, the valve 38, and the steam turbine 22 for estimating moisture content or condensation in pipe 36, the valve 38, and the steam turbine 22. The distributed arrangement of the fiber sensing cables 42 enables to monitor temperature at all points where condensation can occur or water can collect in the pipe 36, the valve 38, and the steam turbine 22. As a result, operability of the steam turbine and the plant can be improved. In one embodiment, the fiber optic sensing system is configured to detect one or more first parameters comprising temperature, strain, pressure, vibration, torque; or combinations thereof related to the pipe 36, the valve 38, and the turbine 22 for estimating fluid flow rate variation, fluid leakage, and thermal loss along the pipe 36 and the valve 38. In certain embodiment, the fiber optic sensing system may be used to control transient operation such as start-up speed of the turbine based on the detected one or more first parameters of the turbine 22, pipe 36, and valve 36.

As discussed above, although the fiber optic sensing system is discussed with reference to steam turbine 22, pipe 36, and the valve 38 of the combined-cycle generating unit, the fiber optic sensing system can be provided for other stationary components or rotary components of the combined-cycle generating unit, for estimating one or more first parameters thereof, so as to estimate one or more second parameters including thermal expansion, clearance between components, moisture content or condensation, fluid flow rate variation, fluid leakage, thermal loss, start-up speed, life, thermal stress, or combinations thereof related to the components. The fiber optic sensing system is also applicable for other applications in which distribution of other sensing systems is complex and expensive, and estimation of one or more second parameters is a concern.

Figure 5:
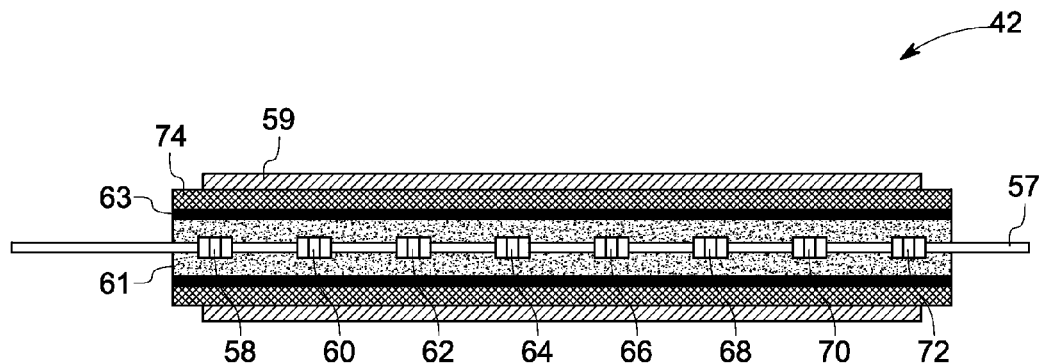
FIG. 5 is a diagrammatical representation of a sensor cable in accordance with an exemplary embodiment of the present invention.

Referring to FIG. 5, an exemplary cable 42 of the fiber optic sensing system is illustrated. The fiber sensing cable 42 includes a core 57, a cladding 61 that is disposed circumferentially about the core 57, and a coating layer 63 that is disposed circumferentially about the fiber cladding 61. In one embodiment, the coating layer 63 includes polyimide, silicone, carbon, acrylate, copper, nickel, gold, aluminum, or combinations thereof. In another embodiment, the coating layer 63 may include a metallic material with higher thermal conductivity and the same thermal expansion coefficient as that of a fiber sensor. A series of Bragg grating elements 58, 60, 62, 64, 66, 68, 70, and 72 are spaced apart by a predetermined distance and disposed within the core 57 and are configured to reflect in phase, wavelengths of light corresponding to a grating period of the grated elements 58, 60, 62, 64, 66, 68, 70, and 72. The cladding 61 provides for near total internal reflection of light within the cable 42, thereby allowing light to be transmitted by and axially through the cable 42. The plurality of grating elements 58, 60, 62, 64, 66, 68, 70, and 72 have an index of refraction different than that of core 57. It should be noted herein that the number of grating elements might vary depending on the application.

The fiber sensing cable 42 further includes a sleeving 74 disposed between the fiber coating layer 63 and an internal wall of a metal tubing 59. The sleeving material 74 may include silica, ceramic material, or combinations thereof. The sleeving 74 provides mechanical strength, and mitigates thermal-induced mechanical stress between the fiber coating layer 63 and the metal tubing 59 due to nearly matched coefficient of thermal expansion of the fiber material. The size of the sleeving 74 components may vary depending on the application. The coefficient of thermal expansion of the sleeving 74 may be same as that of the grating elements. In another case, a hermetical packaged sensing cable may be "sleeveless", when the fiber coating layer is removed. The metal tubing 59 may include stainless steel, inconel, incoloy alloy, or combinations thereof. The coating layer 63, and the metal tubing 59 reflects short wavelength radiation, and is resistant to oxidation at higher temperatures, for example up to 2100 degrees Fahrenheit.

The exemplary fiber sensing cable 42 is robust and can be subjected to rough handling, stepped on, etc. during assembly of the turbine. The exemplary fiber sensing cable 42 is also capable of withstanding high pressure (for example, up to 10,000 psi), and high temperature (for example, up to 1200 degrees Fahrenheit), steam environment. The fiber sensing cable 42 is also capable of withstanding periodic exposure to a moist environment (i.e. during shutdown periods when condensation can exist inside the turbine). In the Low-Pressure (LP) section of the turbine, the fiber sensing cable 42 is also capable of withstanding sub-atmospheric pressures and continuous exposure to moist environment.

Figure 6:
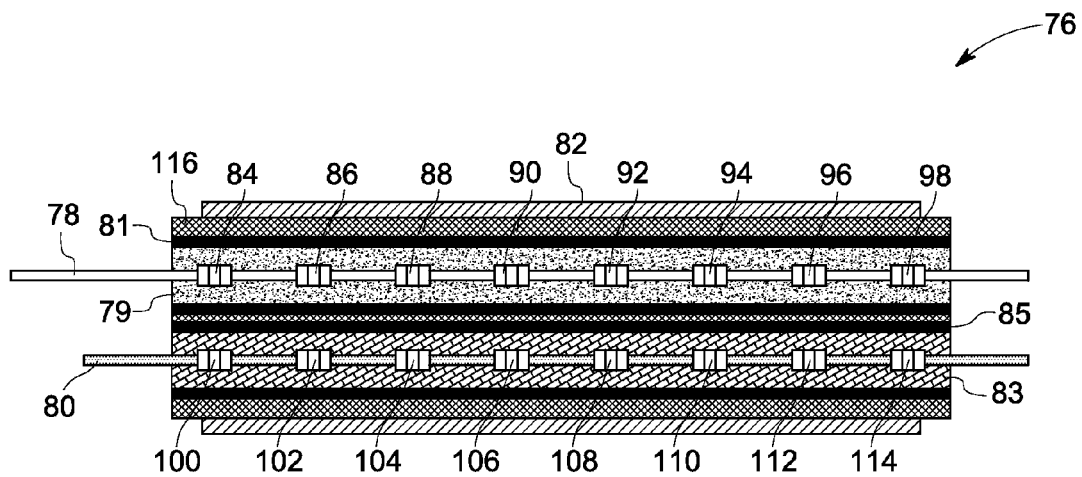
FIG. 6 is a diagrammatical representation of another sensor cable in accordance with an exemplary embodiment of the present invention.

Referring to FIG. 6, an exemplary cable 76 of the fiber optic sensing system is illustrated. In the illustrated embodiment, the cable 76 includes a includes a core 78, a cladding 79 that is disposed circumferentially about the core 78, and a coating layer 81 that is disposed circumferentially about the fiber cladding 79. The cable 76 also includes another core 80, a cladding 83 that is disposed circumferentially about the core 80, and a coating layer 85 that is disposed circumferentially about the fiber cladding 83. A series of grating elements 84, 86, 88, 90, 92, 94, 96, and 98 are spaced apart by a predetermined distance and disposed within the core 78 and are configured to reflect in phase, wavelengths of light corresponding to a grating period of the grated elements 84, 86, 88, 90, 92, 94, 96, and 98. Similarly, another series of grating elements 100, 102, 104, 106, 108, 110, 112, and 114 are spaced apart by a predetermined distance and disposed within the core 80 and are configured to reflect in phase, wavelengths of light corresponding to a grating period of the grating elements 102, 104, 106, 108, 110, 112, and 114. In certain embodiments, both the coating layers 81, 85 include polyimide for applications involving operation temperatures less than 600 degrees fahrenheit. The coating layers 81, 85 may include metallic material such as Nickel or copper alloys for applications involving operation temperatures less than 1000 degrees fahrenheit. The coating layers 81, 85 may include gold for applications involving operation temperatures less than 1500 degrees fahrenheit. In the illustrated embodiment, the grating elements 84, 86, 88, 90, 92, 94, 96, and 98 are disposed offset from the grating elements 100, 102, 104, 106, 108, 110, 112. It should be noted herein that the number of grating elements in each core might vary depending on the application. The cable 76 further includes a sleeving 116 disposed between the cores 78, 80 and a metal tubing 82. It should be noted herein that even though only one sleeving is illustrated, in certain other embodiments, the number of sleeving might vary depending on the application.

Referring to FIG. 7, a fiber optic sensing system 40 in accordance with the exemplary embodiments illustrated in FIGS. 1-6. Each fiber Bragg grating has either periodic or quasi-periodic refractive index modulation. In the illustrated embodiment, the fiber sensing cable 42 illustrated in FIG. 5 is considered as an example. The fiber sensing cable 42 includes the core 57, the cladding 61 that is disposed circumferentially about the core 57, and the coating layer 63 that is disposed circumferentially about the fiber cladding 61. The fiber sensing cable 42 further includes the sleeving 74 disposed between the fiber coating layer 63 and the internal wall of the metal tubing 59. Only two grating elements 58, 60 spaced apart by a predetermined distance "d" and disposed within the core 57 are shown for explanation purpose. The grating elements 58, 60 are configured to reflect in phase, wavelengths of light corresponding to a grating period of the grated elements 58, 60. During operation, an input light signal 118 is provided from a light source 120 to the cable 42 and a portion of the input light signal 118 is reflected by the grating elements 58, 60 in phase and corresponding to certain wavelengths of light, while remaining wavelengths are transmitted as represented by a transmitted signal 122. The index of refraction of the grating elements 58, 60 and distance between the grating elements 58, 60 define the wavelength of light reflected in phase by the grating elements 58, 60.

The sensing system 40 also includes an optical coupler 124 configured to regulate the incoming light signal 118 from the light source 120 and also the reflected signals from the fiber sensing cable 42. The optical coupler 124 directs the appropriate reflected signals to a detection system 126 such as an infrared photo detector system. The detection system 126 receives the reflected optical signals from the fiber sensing cable 42 and provides an output signal to a controller 128. The controller 128 is configured to analyze the embedded information in the output signal from the detection system 126 and estimate a condition or a plurality of parameters of the sealing system based upon a diffraction peak generated from the plurality of grating elements 58, 60 of the fiber sensing cable 42. Parameters may include temperature, strain, pressure, vibrations, torque, or the like. The exemplary fiber sensing cable 42 generates multiple strong diffraction peaks, thereby facilitating segregation of various parameters. In the illustrated embodiment, the first grating element 58 is configured to reflect a first wavelength of light in phase. The reflected optical signal from the grating element 58 may be indicative of temperature on the stationary or rotary component. Also, the second grating element 60 is configured to reflect a second wavelength of light in phase. The reflected optical signal from the grating element 60 may be indicative of strain on the stationary or rotary component. In one example, the grating element may be of an apodized refractive index profile or may be chirped short period grating. In some embodiments, an apodized periodically refractive index modulated grating of 3-15 mm length is inscribed in the fiber core. Similarly, an output signal indicative of the parameters of the stationary or rotary component may be transmitted to an output device such as a control device, personal computer, personal device, laptop, or server. The output information may be used to address concerns or effectuate changes in the stationary or rotary component.

The exemplary sensor utilizes a wavelength encoding within the core 57 to measure a parameter based upon a Bragg resonant wavelength shift that is determined by the product of the effective core refractive index and periodicity of the grating modulation. In the illustrated example, the grating element 58 may be subjected to a tensile strain on the stationary or rotary component during operation. This results in an upward shift in wavelength of light reflected from the element 58. Tensile strain may be detected based on the upward shift in wavelength of reflected light signal. Also, the grating element 58 may be subjected to a compressive strain on the stationary or rotary component. This results in downward shift in wavelength of light reflected from the element 58. Compressive strain may be detected based on downward shift in wavelength of reflected light signal. Similarly in other embodiments one or more static or dynamic parameters, such as torsional and shear strains, may be detected based on shift in wavelength of light signals reflected from plurality of grating elements. It should be noted herein that grating elements providing indication of temperature, strain, pressure, vibration, or the like may either be collocated or in separate sensor cables.

It should be noted herein that the sensing system enables better refinement of analytical models for predicting turbine transient behavior such as casing distortions, clearances, thermal stresses, and impact on component life. The additional data can be used as input to more sophisticated control algorithms that will enable faster startups for improved plant operability and response to short-notice demands for electrical power. Excessively conservative operational constraints that limit startup rates due to concerns about component life and internal clearances can be refined because more data will be available. Operational decisions can be based on actual data instead of conservative interpolations/extrapolations of very limited data.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A device; comprising:
a stationary component;
a rotary component; and
a fiber optic sensing system comprising one or more fiber optic sensors disposed on the stationary component, the rotary component, or combinations thereof; a controller configured to detect one or more first parameters comprising temperature distribution, strain, pressure, vibration, torque, related to the stationary component, the rotary component, or combinations thereof, and determine one or more second parameters comprising clearance, fluid flow rate variation, condensation, fluid leakage, related to the stationary component, the rotary component, or combinations thereof based on the one or more first parameters.

2. The device of claim 1, wherein the device comprises a rotary machine.

3. The device of claim 2, wherein the rotary machine comprises a steam turbine.

4. The device of claim 1, further comprising a plurality of stationary components comprising a stationary casing, pipe, valve, boiler, or combinations thereof; wherein the fiber optic sensing system is disposed on at least one of the plurality of stationary components.

5. The device of claim 4; wherein the one or more first parameters is used to determine one or more second parameters comprising thermal expansion of the stationary casing, clearance between the stationary casing and the rotary component, fluid flow rate variation in the pipe and valve, condensation in the pipe and valve, fluid leakage in the pipe and valve, thermal loss, life, thermal stress.

6. The device of claim 4, wherein the fiber optic sensing system comprises a detection system configured to receive reflected light from the one or more fiber optic sensors.

7. The device of claim 6, wherein the fiber optic sensing system comprises the controller configured to receive an output from the detection system and detect the one or more first parameters based on the output from the detection system.

8. The device of claim 4, wherein a wavelength shift of the one or more fiber optic sensors is calibrated to measure the temperature distribution of the plurality of stationary components comprising the stationary casing, pipe, valve, boiler, or combinations thereof.

9. The device of claim 4, wherein a wavelength shift of the one or more fiber optic sensors is calibrated to measure a mechanical response of the plurality of stationary components comprising the stationary casing, pipe, valve, boiler, or combinations thereof.

10. A steam turbine, comprising:
a stationary casing;
a rotor disposed in the stationary casing; and
a fiber optic sensing system comprising one or more fiber optic sensors disposed on the stationary casing, the rotor, or combinations thereof; a controller configured to detect one or more first parameters comprising temperature distribution, strain, pressure, vibration, torque, related to the stationary casing, the rotor, or combinations thereof, and determine one or more second parameters comprising clearance, fluid flow rate variation, condensation, fluid leakage, related to the stationary casing, the rotor, or combinations thereof, based on the one or more first parameters.

11. The steam turbine of claim 10, further comprising one or more pipes, valves, or combinations thereof; wherein the fiber optic sensing system comprises a cable comprising one or more fiber optic sensors disposed on the one or more pipes, valves, or combinations thereof and configured to detect one or more first parameters comprising temperature distribution, strain, pressure, vibration, torque, related to the one or more pipes, valves, or combinations thereof.

12. The steam turbine of claim 11; wherein the one or more first parameters is used to determine one or more second parameters comprising thermal expansion of the stationary casing, clearance between the stationary casing and the rotor, fluid flow rate variation in the one or more pipes and valves, condensation in the one or more pipes and valves, fluid leakage in one or more pipes and valves, thermal loss, life, thermal stress, start-up speed.

13. The steam turbine of claim 11, wherein the cable is welded to the stationary casing, rotor; one or more pipes, valves, or combinations thereof, wherein operation temperature of the steam turbine is greater than 1000 degrees fahrenheit.

14. The steam turbine of claim 11, wherein the cable is clamped to the stationary casing, rotor, one or more pipes, valves, or combinations thereof, wherein the operation temperature of the steam turbine is lower than 1000 degrees fahrenheit.

15. The steam turbine of claim 11, wherein the cable is glued to the stationary casing, rotor, one or more pipes, valves, or combinations thereof, wherein the operation temperature of the steam turbine is lower than 600 degrees fahrenheit.

16. The steam turbine of claim 11, wherein the cable comprises at least one fiber core, a fiber cladding disposed around the at least one fiber core, and a fiber coating layer disposed around the fiber cladding.

17. The steam turbine of claim 16, wherein the fiber coating layer comprises polyimide, silicone, acrylate, carbon, copper, nickel, gold, aluminum, or combinations thereof.

18. The steam turbine of claim 16, wherein the cable comprises a plurality of fiber bragg grating elements disposed in the fiber core; wherein the fiber bragg grating elements are separated by a predetermined distance.

19. The steam turbine of claim 16, wherein the fiber optic sensing system further comprises a light source configured to illuminate the fiber core via an optical coupler.

20. The steam turbine of claim 16, wherein cable comprises a metal tubing disposed surrounding the fiber coating layer.

21. The steam turbine of claim 16, wherein the cable further comprises a fiber sleeving disposed between the fiber coating layer and the metal tubing.

22. The steam turbine of claim 21, wherein the sleeving comprises silica, ceramic material, or combinations thereof.

23. The steam turbine of claim 10, wherein the fiber optic sensing system comprises an infrared photodetector configured to receive reflected light from the one or more fiber optic sensors.

24. The steam turbine of claim 23, wherein the fiber optic sensing system comprises the controller configured to receive an output from the infrared photodetector and detect the one or more first parameters based on the output from the infrared photodetector.

25. A method comprising:
    directing light from a light source to a fiber optic sensing cable comprising a plurality of fiber optic sensors disposed on a stationary component, a rotary component, or combinations thereof;
    receiving reflected light from the plurality of fiber optic sensors using a detection system; and
    detecting one or more first parameters related to the stationary component, a rotary component, or combinations thereof comprising temperature distribution, strain, pressure, vibration, torque, based on shift in wavelength of light reflected from the plurality of fiber optic sensors, via a controller,
    determining one or more second parameters comprising clearance, fluid flow rate variation, condensation, fluid leakage, related to the stationary component, the rotary component, or combinations thereof based on the one or more first parameters, via the controller.

26. The method of claim 25, further comprising controlling start-up speed of a device based on the one or more second parameters, wherein the device comprises the stationary component, the rotary component, the fiber optic sensing cable, the detection system, and the controller.

* * * * *